US006816956B1

(12) United States Patent
Benayon et al.

(10) Patent No.: US 6,816,956 B1
(45) Date of Patent: *Nov. 9, 2004

(54) USER CONTROL OF MULTIPLE MEMORY HEAPS

(75) Inventors: Jay William Benayon, Ontario (CA); Brian William Thomson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,747

(22) Filed: Jun. 2, 1998

Related U.S. Application Data (63) Continuation of application No. 08/559,904, filed on Feb. 26, 1996, now Pat. No. 5,809,554.

(30) Foreign Application Priority Data

Nov. 18, 1994 (CA) ............................................. 2136154

(51) Int. Cl.[7] ............................................... G06F 12/00

(52) U.S. Cl. ........................ 711/170; 711/171; 718/107

(58) Field of Search ............................... 711/170, 171; 707/205; 709/104, 107; 718/104, 107

(56) References Cited

U.S. PATENT DOCUMENTS

| | | | | |
|---|---|---|---|---|
| 5,437,006 A | * | 7/1995 | Turski | 707/503 |
| 5,559,980 A | * | 9/1996 | Connors et al. | 711/100 |
| 5,561,786 A | * | 10/1996 | Morse | 711/170 |

OTHER PUBLICATIONS

Applegate, Arthur D., "Rethinking Memory Management" Dr. Dobb's Journal, Jun. 1994: p 52–55.*
Carlini et al., "Garbage Collection for C Programs; there's no need to explicitly free memory", Dr. Dobb's Journal, Nov. 1992: p. 46(5).*
Borland International, "Borland C++ Version 3.0 Programmer's Guide", Borland International, Inc. 1991: p. 30, 124–125.*
Stevens, Richard W. "Advanced Programming in the UNIX Environment", Addison–Wesley Publishing Company, Reading, Mass. 1992: pp. 20–22 and 169–171.*

* cited by examiner

Primary Examiner—Reginald G. Bragdon
(74) Attorney, Agent, or Firm—Edward H. Duffield; John D. Flynn (57) ABSTRACT

Control and administration of the supply of memory managed in multiple heaps by a library heap management facility. Control data used by the heap management facility is located in user-supplied memory. Heaps are created dynamically through calls from the application to a runtime library. Allocation within a heap is performed through calls to the runtime library that canvass the available heap memory for each allocation request. If no suitable block of heap memory is located, additional user supplied memory is requested for the application through a callback function. A second callback function notifies the user when a supplied unit of memory is no longer required by the heap and may be disposed of. The callback functions are specified separately for each heap. The user may also set the default heap in the runtime library by allocation requests from a vendor library that do not specify a heap. This can be done a per thread basis in multithreaded applications so that different executing threads can use different default heaps in a non-interfering manner.

19 Claims, 8 Drawing Sheets

USER CONTROL OF MULTIPLE MEMORY HEAPS

This application is a continuation of Ser. No. 08/559,904 filed Feb. 26, 1996, now U.S. Pat. No. 5,809,554.

FIELD OF THE INVENTION

The present invention relates to improved memory management in a computing environment by permitting the dynamic allocation of multiple memory heaps as required during program execution, and providing the user with direct control over all memory managed or used by each heap.

BACKGROUND OF THE INVENTION

The heap is that area in memory that is generally allocated at the commencement of program execution for dynamically constructing data objects used for executing the application. Traditionally, the heap remains static during program execution, and is destroyed at the completion of the application.

While early programming systems allocated only one heap during program execution, the intermingling of 16-bit and 32-bit code within applications has resulted in more recent operating systems, such as IBM's OS/2™ operating system, providing support for allocating two heaps. Generally, these two heaps are referred to as the regular heap for receiving only 32-bit coded data objects, and tiled heap that is usable either for 16 or 32-bit code.

The so-called regular heap is based on flat or linear pointers (addresses) referenced to a zero-based address. The heap itself, then, can span a very large segment of memory (up to four gigabytes in size) with pointers based on the same flat or zero address base.

Tiled memory, refers to the fact that the pointers are tiled—their base linear addresses are set to be multiples of 64K because of a limitation in 16-bit code precluding the referencing of data objects spanning 64K boundaries.

A further type of heap in recent development is a shared memory heap (whether in regular or tiled format) that would permit data objects to be accessed directly by several applications at once, or by multiple instances of a single application. Clearly, the shared memory concept reduces processing time by avoiding construction of the same data objects in multiple applications and by simplifying the problems of synchronization and coherence where one application modifies the data.

Multiple heaps (that is, even more than two), have been provided in very recent products such as "SmartHeap" of MicroQuill Software Publishing. The value of any double or multiple heap system includes better data locality, the ability to free one heap in a single efficient operation, while retaining data in other heaps, and less contention in multi-threaded applications if each thread has its own heap, and this has been accomplished in the prior art through system calls controlled by the runtime library as described below.

Figure 1:
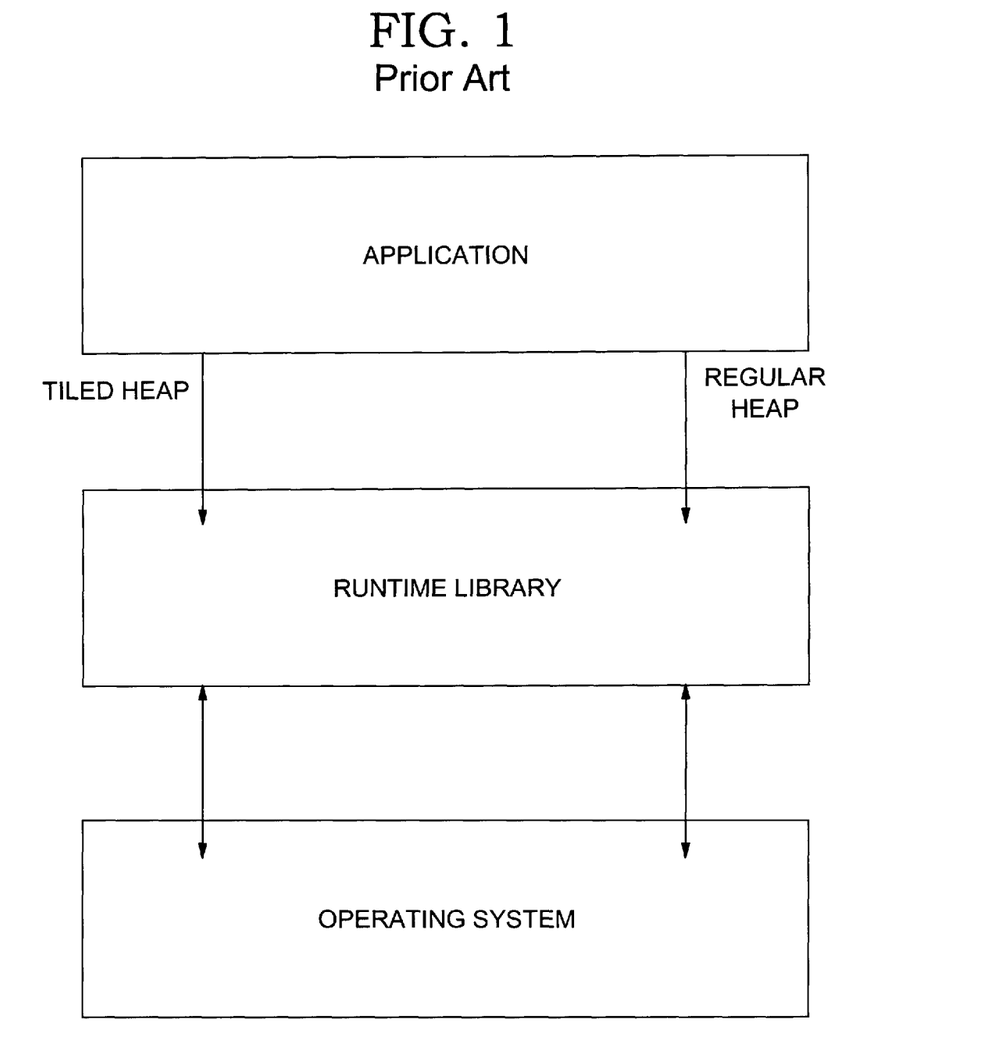
FIG. 1 is a simplified block diagram illustrating the processing requests for heap memory allocation from an executing application, according to the method of the prior art.

As illustrated schematically in FIG. 1, an application call to allocate/deallocate additional heap memory (tiled or regular) is issued to the runtime library and is processed by a memory manager located in the library by issuing system calls to the operating system to acquire or release memory for the heap. Under the traditional approach, allocation of additional heap memory is controlled entirely by the runtime library, not by the user.

In "A List Box Replacement"—Benge, mark A. and Smith, Matt, OS/2 Developer, January/February 1994, pages 66 to 70, a modification of the traditional memory management system is described that is claimed to permit the user somewhat more flexibility in allocating memory from different heaps and to guarantee minimal memory configurations when required by the user. A new HeapAlloc call initiates the heap by requesting a block of memory using a DosAllocMem system call. The address returned by DosAllocMem is the starting chunk of memory for the heap and is invariably used as the heap handle. When this value is passed to HeapMalloc, HeapCalloc, HeapRealloc, and HeapFree routines, each routine will correctly select the starting chunk and determine from which memory chain to carve or free the memory. To discard the heap, a new HeapRelease call is used that releases all the memory of the heap, (not individual memory blocks) back to the system.

Attempts have been made to deal with memory management without having to resort to expensive system calls at each instance. For example, in U.S. Pat. No. 5,339,411—Heaton, a method is disclosed in which the memory is allocated into a number of memory blocks of varying size at the time the memory space is initialized (usually during initialization of the application program). Then, in response to a memory allocation request during execution of the application, a routine is initiated that scans the stored block constants to locate a memory block of the appropriate size to meet the specifications of the allocation request. A mechanism is also provided that permits encroachment into a second adjacent memory block where no one memory block is large enough to meet the specifications of the memory allocation request. Other references, such as U.S. Pat. No. 5,088,036—Ellis, et. al. And U.S. Pat. No. 5,136,706—Courts propose methods for more efficient memory management through dividing the available memory space into regions with specific attributes so that only active objects are located in active regions, to reduce paging and other accessing operations.

Improved garbage collection, such as in the methods proposed in U.S. Pat. No. 4,907,151—Bartlett and U.S. Pat. No. 5,109,336—Guenther, et. al., is another way to maximize memory management efficiency in a predefined memory space.

In addition to the foregoing, U.S. Pat. No. 5,317,706—Pechter provides a hardware solution to increasing available virtual memory spacing in a processing environment through the addition of extended memory circuits. The extended memory is logically located or mapped to a portion of the original virtual address space which has been partitioned into a reduced virtual address space and an extended real memory address space.

However, none of the prior art methods proposed in the patent literature improve upon the traditional method for increasing heap memory allocation during program execution described above, that is through the routine allocation of additional memory instituted through system calls.

In addition, nothing in the prior art suggests a memory management system that actually permits the user to control the heap or type of heap in which the objects are to be constructed and controls the creation (allocation) and destruction (deallocation) of different heaps and different heap types.

SUMMARY OF THE INVENTION

It is therefore an object of the present invention to provide user control of multiple heaps in an operating system.

It is also an object of this invention to provide better performance of allocation and freeing operations within a heap, and to provide the user with the ability to free a single heap in one efficient operation while retaining data allocated in other heaps.

A further object is to provide less contention in multi-threaded applications, by providing the user with the ability to allocate to each executing thread its own dedicated heap.

Accordingly, the present invention provides a mechanism for user heap management during program execution in an operating system that allocates dynamic memory. The mechanism consists of controls located in the executing program for directing heap allocation requests, preferably on data storage media adapted to be executed on a general purpose computer.

Preferably, in one aspect, the controls consist of executable steps for locating a block of heap memory of a suitable size for fulfilling the allocation request along executable steps for storing information in a portion of the heap memory defining parameters of the heap memory.

Preferably, in another aspect, the controls consist of executable steps for setting a default heap definition in the runtime library means.

The present invention also provides a process for managing heap allocation from a user application executing in an operating system to extend heap memory. The process includes the steps of issuing a callback function from the runtime library to the user application for a heap extension of at least the minimum size, determining if a block of memory of at least the minimum size is available, and removing and returning to the user application an object of at least the minimum size from the block of heap memory.

Preferably, the process also includes the steps of initiating a call to the operating system from the user application for heap memory extension on receiving a null determination of available heap memory and inserting heap control data into a block of heap memory allocated by the call to the operating system.

Alternatively, the invention provides a process for directing heap memory use from a user application executing in an operating system having a runtime library and at least a secondary library. The process includes the steps of issuing a function call from the user application to the runtime library to define a default heap in the runtime library, the issuing of a function call from the user application to the secondary library for construction of a data object on the default heap, and finally issuing a heap allocation request from the secondary library to the runtime library for construction of the data object on the default heap.

Preferably, the above steps may be repeated for every thread in a multithreaded user application.

BRIEF DESCRIPTION OF THE DRAWINGS

Embodiments of the invention will now be described in detail in association with accompanying drawings, in which.

DETAILED DESCRIPTION OF PREFERRED EMBODIMENTS

Figure 2:
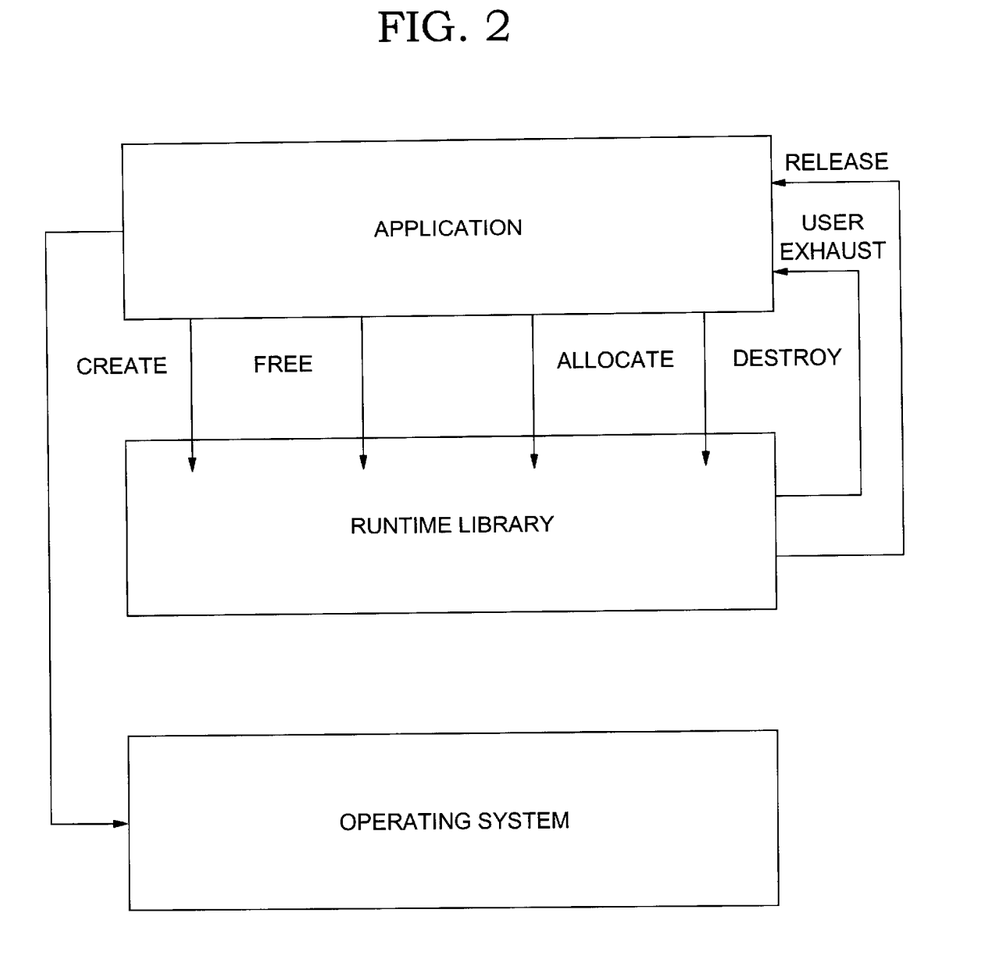
FIG. 2 is a simplified block diagram illustrating the processing of requests for heap memory allocation from an executing application, according to one aspect of the present invention.

Unlike the prior art process illustrated in FIG. 1, in the present invention, heap expansion or contraction requests from the runtime library are made to the application, which can then issue corresponding requests to the operating system as illustrated schematically in FIG. 2. There is no longer a direct communication for this purpose between the runtime library and the operating system, with the result that the user has full control over heap memory allocation.

This is accomplished by locating the heap control data, that include the heap type (tiled, shared, etc.) and semaphores for multithreading in memory supplied by the application, rather than in the runtime library as in the prior art. In the preferred embodiment, the heap control data includes "sanity marks" which are known to those skilled in the art and which are data of a predetermined value, such value being selected with the expectation that it would be unlikely to be found in a memory area chosen at random. In the preferred embodiment, the presence of the sanity marks in the expected location within the control data area of a purported heap is considered evidence that the purported heap is a valid heap. Then, for heap memory allocation, the runtime library must make callbacks to the application rather than system calls to the operating system to grow or shrink the pool of available memory on a heap.

The application thereby controls requests to create, free, allocate, release, exhaust and destroy heaps as illustrated by the event edges in FIG. 2.

Growable and shrinkable heaps are implemented by two callback functions, according to the preferred embodiment of the invention. One function, exhausted, is called during an allocation request that cannot be satisfied by available free heap memory and allows the heap creator to optionally grow the heap with memory of the appropriate type. The second function, release, is called when the heap is being destroyed and allows the heap creator to release all blocks of memory provided to that heap. The heap may also be grown by the user function _uaddmem described below.

The user provides an initial starting block for the heap routines to use. If a particular pool cannot satisfy an allocation request, then an exhausted routine provided by the user will be called specifying the minimal amount of memory that the heap requires to satisfy the user allocation. This process will continue until the heap is destroyed and the user release routine is called for every block of memory that was inserted into the heap by the user.

Figure 3:
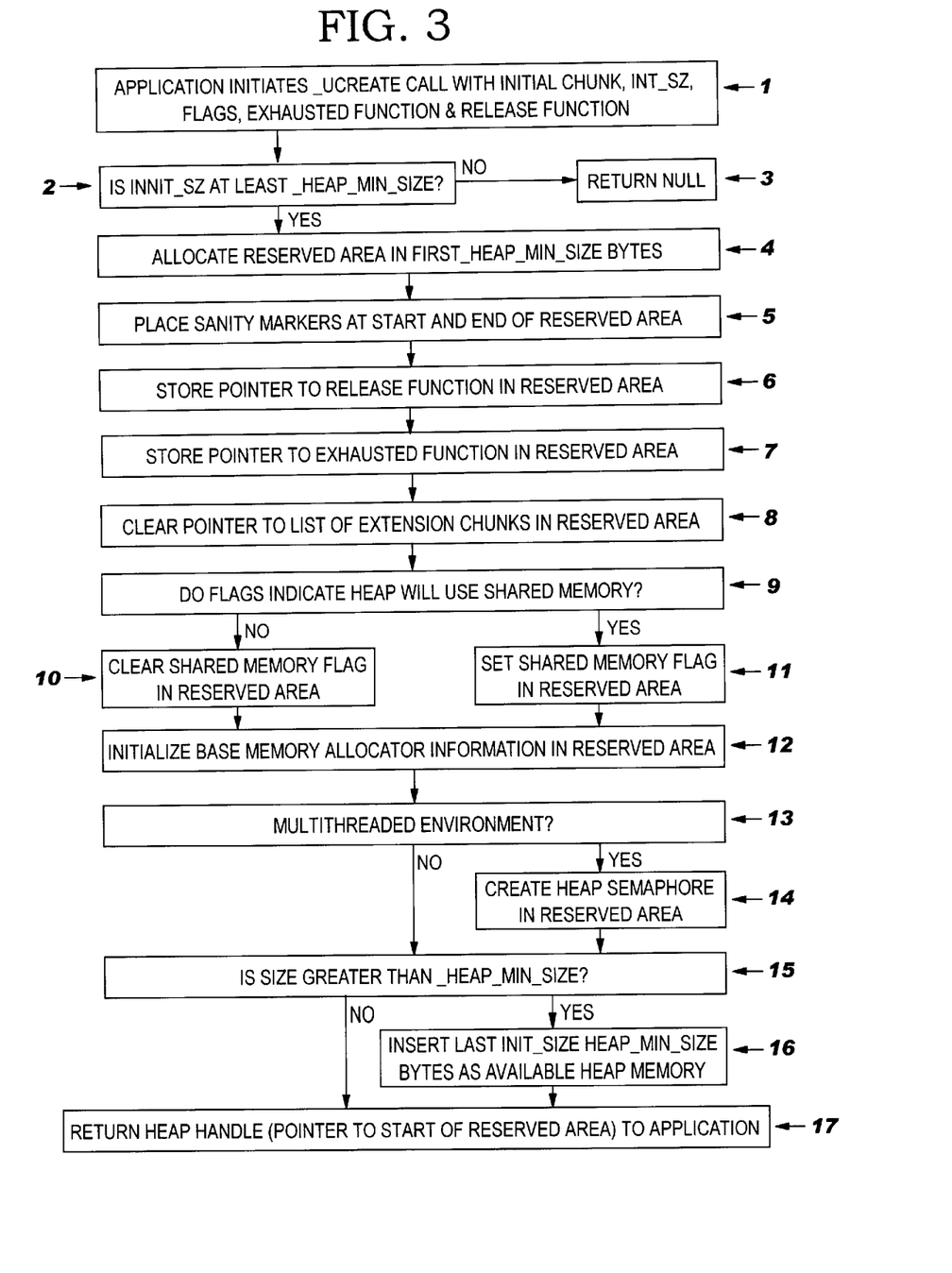
FIG. 3 is a flow diagram illustrating the use of the _ucreate function to create a new heap.

The initial block of memory of the desired type is supplied by the user using the _ucreate function, to be described in detail below. In addition to this, the following functions are defined in the runtime library in the preferred embodiment of the invention in order to implement callbacks from the runtime library:

```
Heap_t    _ucreate(void *pool, size_t init_sz, int blockclean,
          int mem_flags
          void *(*exhausted) (size_t *sz, int *clean),
          void (*release) (void *block,size_t sz))
```

As illustrated in FIG. 3 and in the C code fragment above, in a preferred embodiment, the invention provides _ucreate which creates a user heap. The function operates similarly whether or not another heap already exists. In the first step (block 1) the application initiates the _ucreate call and defines an initial chunk of memory needed, size, flags, exhausted function and release function. The _ucreate function returns the handle heap_t identifying the heap. The parameters passed by the user include pool, which is the memory address of the initial block available for use, of the size init_sz bytes, which must be at least _HEAP_MIN_SIZE (block 2). If the initial size init_sz of the block is smaller than HEAP_MIN_SIZE, the system returns a NULL (block 3). If the initial size is at least equal to _HEAP_MIN_SIZE bytes, the runtime will mark the first _HEAP_MIN_SIZE bytes as a reserved area for the heap which will be used to store information relative to the heap as described below with respect to the heap structure (block 4). NULL will also be returned if any other errors occur on the call. Sanity markers are placed at the start and end of the reserved area (block 5). A pointer to the release function is assigned with the value passed (block 6), and a pointer to the exhausted function is assigned with the value passed (block 7). A pointer to the list of all the chunks of memory inserted into the heap is cleared (block 8), all these pointers in blocks 6, 7 and 8 being in the reserved area. A flag in the reserved area is set if the heap will be using shared memory, and is cleared if the heap will not be using shared memory (blocks 9, 10, and 11).

A structure containing all the necessary information for the heap management routines is initialized (block 12). This structure may contain the start of the free object list, a pointer to the used list, the minimum and maximum addresses inserted into the heap, and statistics indicating the amount of used memory. This is equivalent to placing all the global variables specific to the single heap implementation in a structure within this reserved area.

In the case of a multithreaded environment, a semaphore specific to this particular heap is created (block 13 and 14) via a system call, and the structure for it is also stored with the reserved area.

The remaining pool that was passed in, less the area marked as reserved, is inserted into the heap used to manage the memory (block 15 and 16). The operation of insertion onto the heap is specific to the base memory management algorithm used.

A pointer to the start of the reserved area is returned to the user as a heap handle to the newly created heap (block 17). The user will reference this value as a heap handle in future heap specific calls.

In void* (*exhausted) (size_t*sz, int*clean), exhausted is a pointer to a callback function that will be issued by the runtime library if it has insufficient memory available in the heap to satisfy an allocation request from the application. The sz points to an unsigned integer variable initialized to the minimal amount of memory that this routine must provide back to the heap routines. The returned value is a pointer to a chunk of memory supplied by the application to extend the heap, or is a null if the application declines to extend the heap. The user has the option to return a larger block than requested by modifying the size variable, *sz.

The clean parameter will point to an integer variable that must be set by the exhausted function to the value _BLOCK_CLEAN to indicate that the block is all zeros or to !_BLOCK_CLEAN to indicate otherwise.

void (*release) (void*block, size_t sz), the block will
     point to a memory block that was provided by the user
     by the exhausted routine or _uaddmem.

This callback routine will be called from _udestroy for a user created (or assigned) memory pool that requires blocks to be returned back to the operating system mem_flags: can be defined as _HEAP_TILED,
     _HEAP_SHARED, or _HEAP_REGULAR
  exhausted: is the user callback function called when
     memory is required by the heap.
  release: is the user callback function called when memory
     is released by the heap.
  int _uopen(Heap_t heap)
  where heap is a valid heap handle identifying a heap that
     will be opened for usage.

This function allows the current process to use the heap, and must be called in all processes where the heap will be access implicitly and explicitly. If successful, 0 [zero] is returned.

In operation, the _uopen function called by the user application (FIG. 4, block 20) accepts a heap handle that points to the heap internal structure. The heap internal structure sanity marks are checked within the reserved area and an error reported if they are not the predetermined values (blocks 22, 24).

Figure 4:
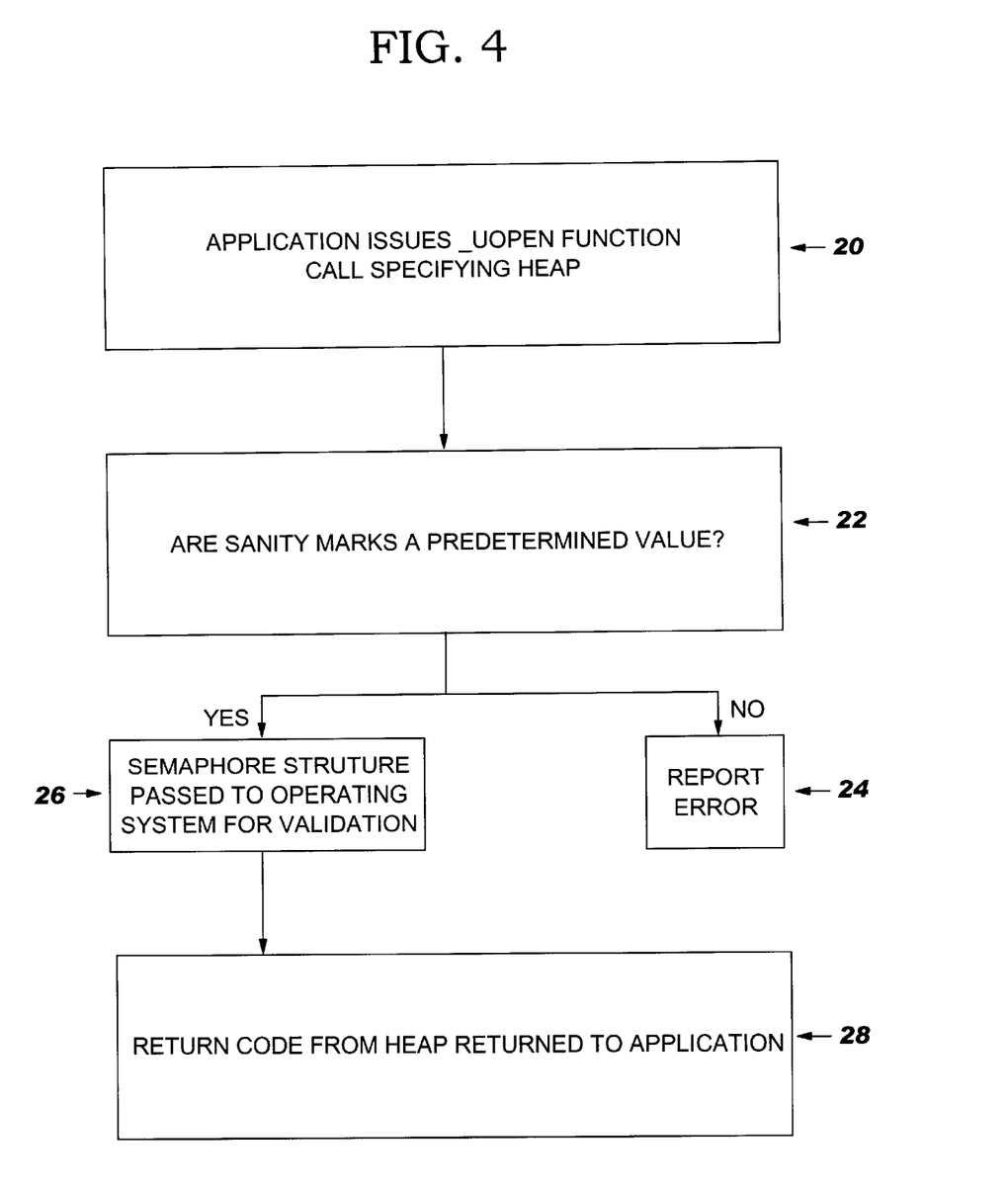
FIG. 4 is a flow diagram illustrating the use of the _uopen function to open an existing heap for use.

Knowing that a valid internal heap structure exists, the system specific structure for the semaphore is passed on to the operating system to grant access to this semaphore to the current process that initiated the call (block 26).

The return code received by the operating system is then returned to the user indicating the opening of the semaphore was performed successfully (block 28).

Int _uclose(Heap_t heap)
  where: heap is a valid heap handle identifying a heap that
     will be closed for usage.

This function notifies the runtime that the executing application will no longer require the usage of this heap. If successful, 0 is returned.

The operation of this routine although opposite in purpose to the operation of the _uopen function, follows the same steps as those illustrated in FIG. 4. When called by the application (block 20), _uclose will accept a heap handle that points to the heap internal structure. The heap internal structure sanity marks will be checked within the reserved area and an error reported if it is not a predetermined value (block 22, 24).

Knowing that a valid internal heap structure exists, the system specific structure for the semaphore will be passed on to the operating system to remove access of this semaphore by the current process that initiated the call (block 26).

The return code received from the operating system is then returned to the user indicating if the opening of the semaphore was performed successfully (block 28).

void*_umalloc(Heap_t heap, size_t size)
  void*_ucalloc(Heap_t heap, size_t size, size_t qty)

These functions will behave exactly like the non-heap version except that allocations will be made from the supplied heap. NULL will be returned if the request cannot be satisfied by the exhausted function.

Figure 5:
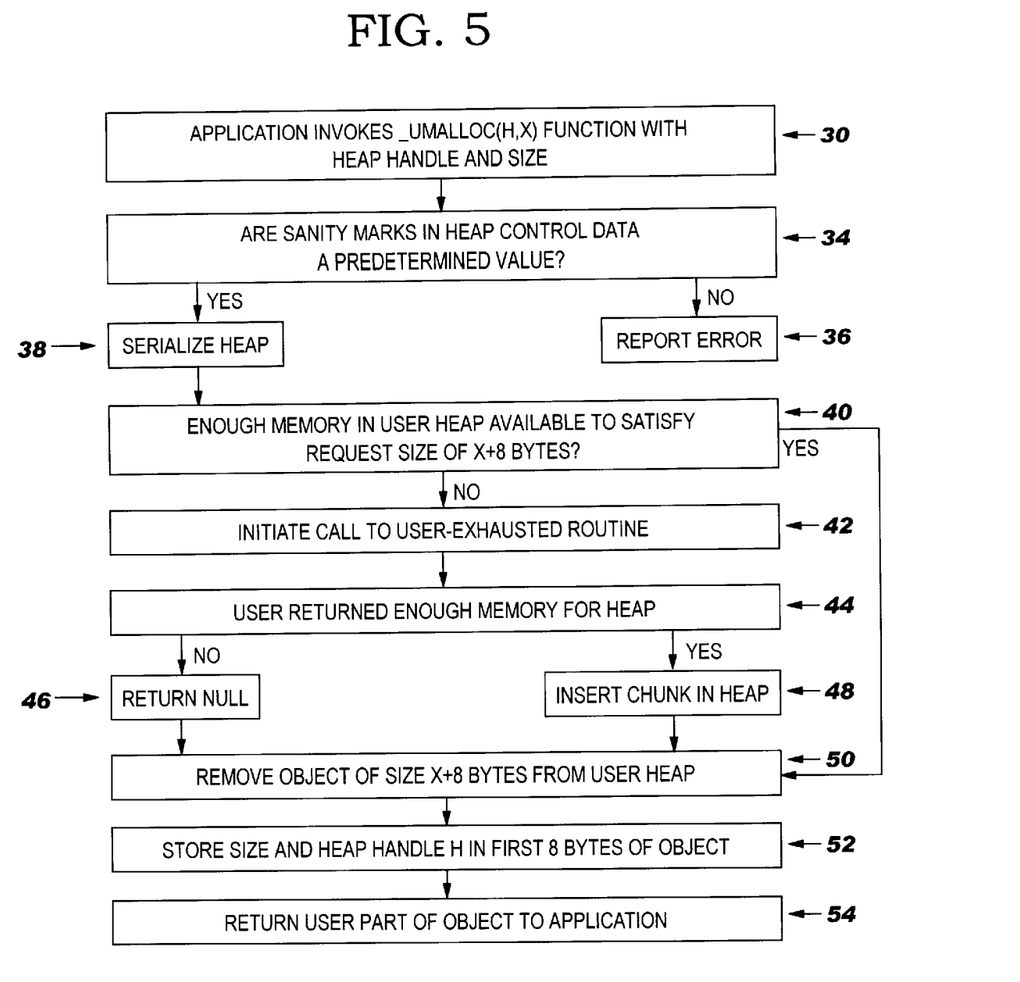
FIG. 5 is a flow diagram illustrating the use of the user exhausted routine during operation of a memory allocation, according to one aspect of the present invention.

_umalloc allocates memory from the supplied heap area of the size specified, as illustrated in FIG. 5. The routine is called by the application, and accepts a heap handle that points to the heap internal structure (block 30). The heap internal structure sanity marks will be checked within the reserved area and an error reported if they are not predetermined values (blocks 34, 36).

The heap is serialized by methods known to those skilled in the art, for example by locking a system semaphore stored in the heap reserved area (block 38).

Using this heap handle, a call to the memory allocation algorithm is made for a request of the provided size (block 38). If there is not enough memory available in the specified heap to satisfy the request (block 40), then the user's exhausted callback function (specified in _ucreate) is called with the size required (block 42). If the callback returns a NULL indicating that it could not satisfy the request, then NULL is returned back to the original caller (block 44, 46). Otherwise, the new object inserted is added to the linked list maintained within the heap reserved area for inserted user objects.

The new block returned by the callback routine is inserted into the heap (block 48). The object of the required size is removed from the heap (block 50) and the size and handle are stored in the first eight bytes of the object (block 52). The user part of the object is returned to the application (block 54).

Figure 7:
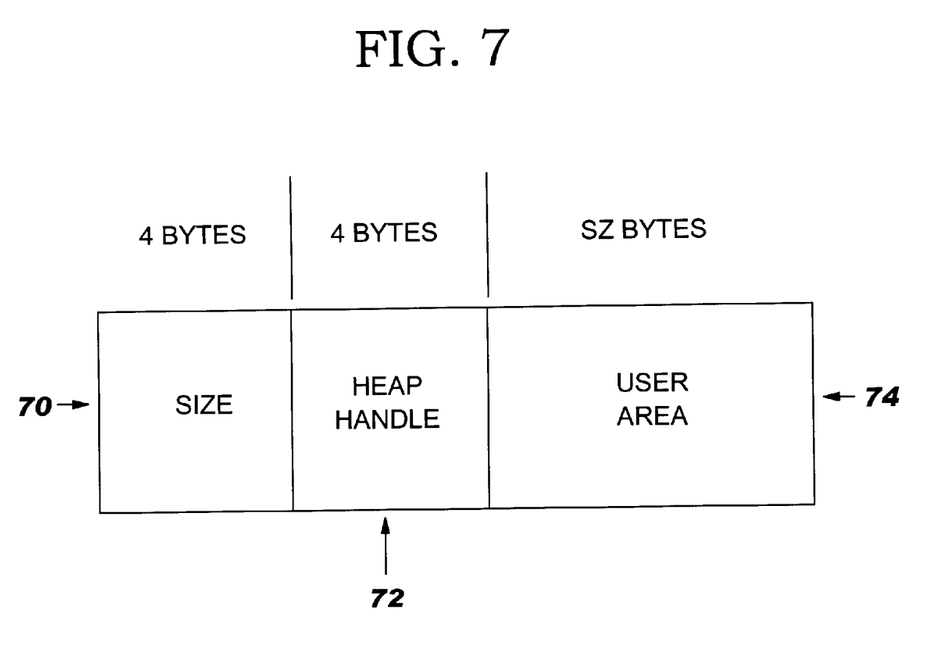
FIG. 7, on the same page as FIG. 4, is a schematic diagram showing the partitioning of memory allocated in the heap according to the present invention.

In order to recognize the heap where an object was allocated from during deallocation, an internal area within the object returned must be set to mark the size and heap handle used as illustrated in FIG. 7. The portions of the heap allocated to size 70 and heap handle 72 making up the internal information of the allocated object, are returned by regular _umalloc function to the user. The remaining sz bytes constitutes the user area 74 in the object. The address returned to the user is the address of the user area 74 within the object.

The heap is deserialized by methods known to those skilled in the art, for example by unlocking a system semaphore stored in the heap reserved area.

The _ucalloc function is similar to that of _umalloc except the memory area is cleared with the null byte on return.

void free(void*ptr)

void*realloc(void*ptr, size_t size)

The routines will determine the heap used during the initial allocation, and then perform the given operation based on that heap. If NULL is passed to realloc, then the default heap will be used for the allocation. The return values and expected arguments will be the same as in free and realloc calls known to those skilled in the art.

Heap_t_uaddmem (Heap_t heap, void*block, size-t sz, int clean)

This user function can be used to extend a heap by adding a chunk of memory to it. The parameter block here points to the chunk of memory that the application is providing to extend the heap.

Int_udestroy(Heap_t heap, int force)

where: heap is a handle identifying a valid heap that will be destroyed.

_FORCE forces destruction if allocated objects still exist

This function collapses the entire heap specified by calling the release function specified in _ucreate for every chunk of memory supplied by the user via _uaddmem, or via the exhausted callback function. Usage of the heap after _udestroy results in undefined behaviour. If successful, 0 is returned.

Figure 6:
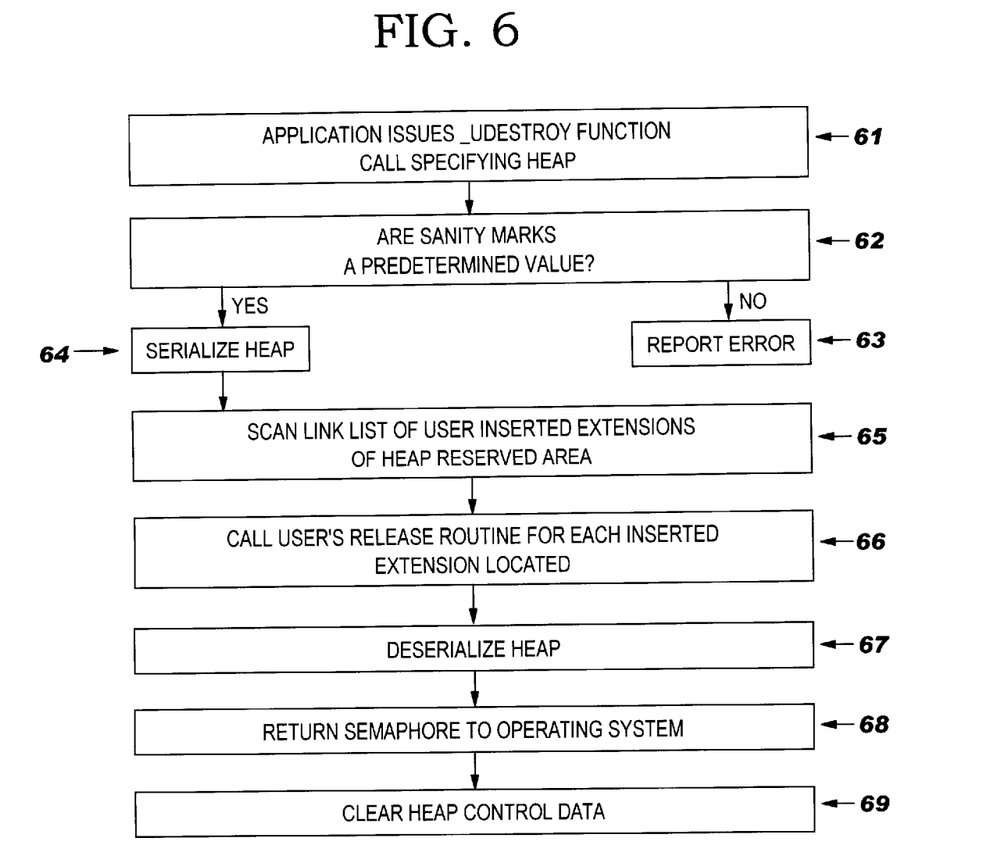
FIG. 6 is a flow diagram illustrating the use of the _udestroy function to collapse the entire heap, according to one aspect of the present invention.

The operation of this routine is illustrated in FIG. 6. The _udestroy function call issued by the application (block 61) accepts a heap handle that points to the heap internal structure. The heap internal structure sanity marks are checked within the reserved area (block 62) and an error reported if it is not a predetermined value (block 63).

Access to the heap is serialized by locking a system semaphore stored in the heap reserved area (block 64).

Next, the linked list of user-inserted extensions of the reserved heap area is scanned (block 65). Each of the extensions was inserted into the linked list following a call to the user's exhausted routine when an allocation request could not be satisfied with the contents of the heap at that time.

For each of these extensions within the linked list, the user's release routine is called so they can properly return the memory extensions from wherever they obtained it (block 66). The call to the callback function returns the memory pointer originally provided as well as the size.

Access to the heap is deserialized by unlocking a system semaphore stored in the heap reserved area (block 67), and the semaphore specific to this heap is returned back to the operating system (block 68).

The remaining original chunk of memory supplied by the user during the _ucreate, containing heap control data, is cleared to prevent further allocations from this heap (block 69).

EXAMPLE

The following example illustrates how the user heap routines are used to implement a separate allocation pool. In this example, a user heap is created with the minimum startup size. The example then allocates an object of 1000 bytes using the _umalloc function which causes the user get_fn to be called since the heap is empty at this point. The get_fn is called with a length of 1000 bytes plus some overhead which it modifies to 65536 since it is a much more practical increment to get from the operating system.

The get_fn callback routine rounds up the requested length to a multiple of the system page size and attempts to obtain a block of memory of this size directly from the operating system.

```
#define sys_page_size (4096*16)
static void*get_fn(size_t*length, int*clean)
{
void*p;
/*mark the block we are returning as clean*/
*clean=_BLOCK_CLEAN *length=(*length/sys_
    page_size)*sys_page_size+sys_page_size;
/*Make a system call to acquire memory*/
p=GetMemFromSystem (*length);
return(p);
(
```

To collapse the heap, a call to _udestroy is made which would call the user's free_fn release function for every chunk that was provided, and then clear the original starting chunk provided during heap creation.

The following free_fn callback routine will be called when the memory routines deem that a block of memory that was provided earlier is no longer needed and can be returned back to the operating system.

```
static void free_fn(void*p, size_t sz)
{
ReturnMemToSystem(p,sz);
return;
}
int main(void)
(
```

```
Heap_t my_heap;
char starting_chunk [_HEAP_MIN_SIZE];
void*p;
/*create a user heap with the starting chunk being the
    minimum size*/
my_heap=_ucreate(starting_chunk, _HEAP_MIN_
    SIZE,
!_BLOCK_CLEAN,
    _HEAP_REGULAR, get_fn, free_fn);
if (my_heap==NULL) puts(_ucreate failed);
p=_umalloc(my_heap,1000)
if (p==NULL) puts(_umalloc failed);
free(p);
/*Now destroy the heap since it is no longer needed*/
    _udestroy(my_heap);
return(0);
```

In the above examples, GetMemFromSystem and ReturnMemToSystem indicate standard system calls to obtain and release memory.

For compiler and runtime library writers that wish to implement a multiple heap memory manager on top of a single heap implementation, the goal is to convert a single heap implementation into a multiple heap version that can process all memory types seamlessly. Therefore, the base memory allocator must be modified as follows:

Create a heap structure to store all the global variables related to the memory routines. This information will be stored in the heap reserved area.

Declare a heap structure inernally to contain the following:
   Sanity value
   Base memory allocator information
      pointers to free list, allocation lists, temporary variables and semaphore structures
   A function pointer to the exhausted routine
   A function pointer to the release routine
   A flag denoting the type of memory it is handling. This is only necessary if the base memory allocator needs to process different types of memory differently. For example, tiled memory is required in a segmented architecture to ensure a block of memory does not cross a segment boundary.
   A pointer to maintain a linked list of blocks of memory that the user's callback routine returned during an allocation request.

Modify the routine that acquired memory from the operating system to use the exhausted callback routine specific for the heap call.

Modify the routine that returned memory to the operating system on heap destruction or termination to use the release callback routine specific for the heap call.

If the environment supports threads, then support should be added to synchronize code at the heap level rather than the function level. This will allow calls in separate threads to the same heap to execute concurrently.

Modify the base memory allocator to encode the heap handle used for the allocation within the returned object.

Modify the free and realloc routines to determine the heap used for the object to be released and perform the necessary operation on that specific heap only.

Define the following macros:
   _BLOCK_CLEAN—Specify if inserted memory into the heap is all zeroes.
   _HEAP_MIN_SIZE—Minimum memory size required to create a heap.
      This value must be at least equal to the size of the heap structure previously declared in the runtime library.

Figure 8:
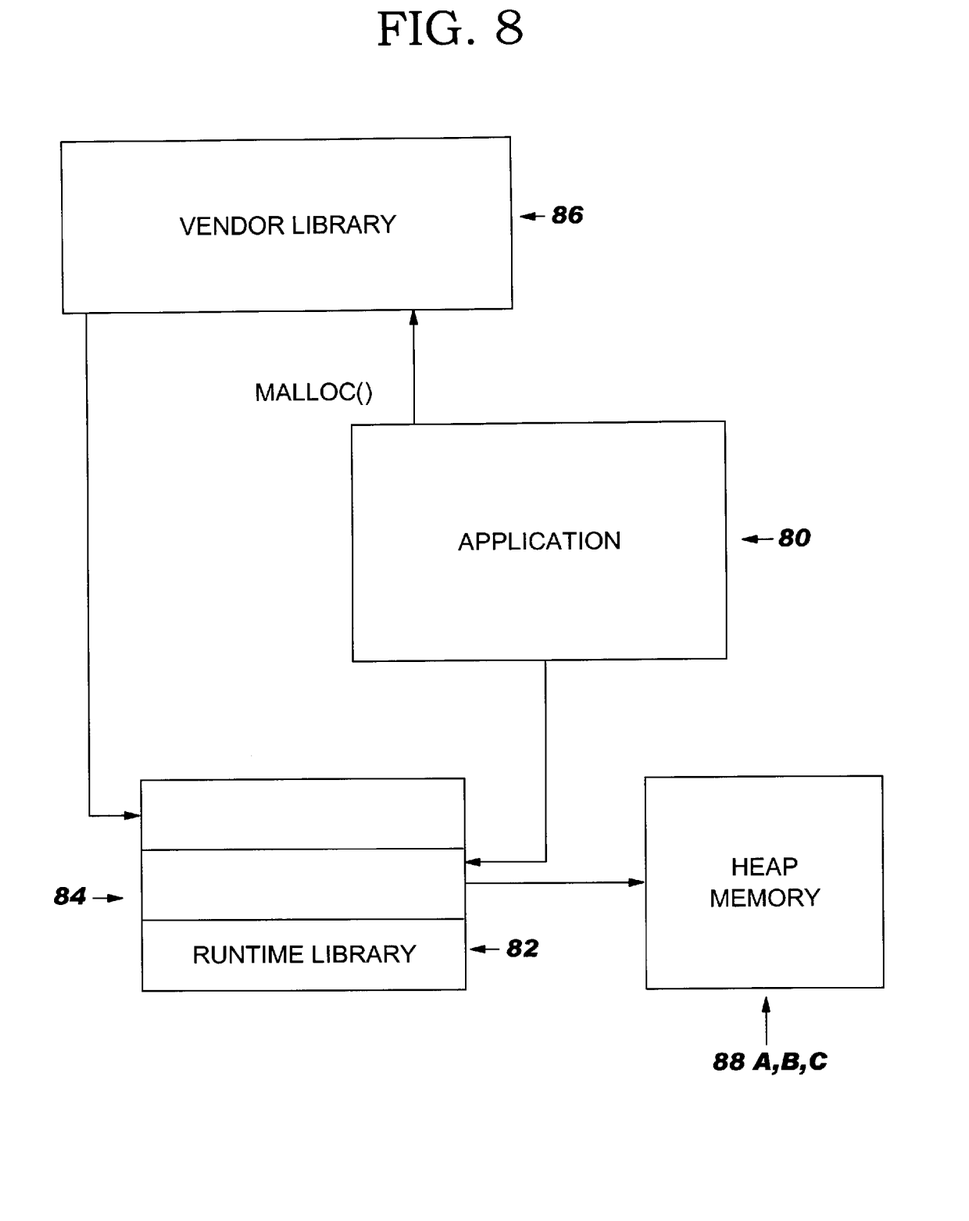
FIG. 8 is a schematic diagram illustrating the setting of a default heap, according to another aspect of the present invention.

A further aspect of the present invention is illustrated in the flow diagram of FIG. 8. Multiple dynamic memory heaps give users flexibility in managing their storage use, and allow them to selectively allocate data in different types of memory. For example, an application may use one private heap of regular memory, and a second heap built with shared memory that is accessible to other applications and processes.

However, a severe problem with allocations occurs in vendor supplied object code only (OCO) libraries that were not constructed with multiple heaps in mind, since the user is not in a position to make the source level modifications necessary to use multiple heaps.

Accordingly, this aspect of the invention is directed to providing a mechanism whereby users can specify a heap to temporarily replace the standard default heap defined in the runtime library. This specified default heap will be used for all allocation requests that do not explicitly specify a heap, and allows for transparent migration from single to multiple heap strategies, particularly for using shared memory heaps in unmodified OCO libraries.

As illustrated in FIG. 8, the application 80 first calls down to the runtime library 82 to set the default 84 to the required heap (88*a*, 88*b* or 88*c*). The application 80 then calls the vendor library 86, which in turn issues a malloc call that will use the default 84 set previously set by the application.

New routines are written with the old names of the allocation routines that determine which heap is considered the default and call the multiple heap version with it as an argument.

Functions
   Heap_t_udefault(Heap_t newHeap)
   This routine must be called within each thread that the default allocation routines are to be implicitly acquired from a private heap. Internally, all that is done is change an internal variable within the runtime library that denotes the current default heap to the value passed in by the user. The return value is the previous default heap prior to replacement.
   void*malloc(size_t sz)
   This allocation routine will acquire storage size sz from the current active default heap. The active default heap is set previously within the application by the user making a _udefault call. If such call was not made then the default runtime heap that the library determines will be used.
   void*calloc(size_t size, size_t qty)
   This function is similar to that of malloc except the memory area is cleared with the null byte on return.
   void*realloc (void*p, size_t newsize)
   This function reallocates the object pointed to by the p parameter, such that it will have size newsize. The object is reallocated in the same heap, except if pointer p is null, it will be reallocated in the current default heap.

In a multithreaded environment, the default heap handle set by the_udefault call can be set on a per thread basis, and would be stored by the runtime library separately for each thread.

The invention can be used with user libraries that are build to use only one heap, by defining the secondary library function with redefines the default shared memory heap prior to the calling of the secondary library function. Following the completion of the secondary library function, the default heap is redefined to the previous heap, and thus the secondary library function does not interfere with the operations performed with any other thread. An example of such function is below:

Heap_t oldHeap;
oldHeap=_udefault(sharedMemoryHeap);
LibraryFunction; /*call OCO routine*/
void_udefault(oldHeap); /*restore previous heap*/

The library function and all functions it calls will use shared memory heap to satisfy all non-heap-specific allocation requests in a way that it does not interfere with later operations performed in the current thread.

The foregoing invention has been described in association with specific embodiments. However, modifications to those skilled in the art are intended to be covered by the appended claims.

The embodiments of the invention in which an exclusive property or privilege is claimed are defined as follows:

1. A mechanism for user heap management during program execution in an operating system having means for allocating dynamic memory and a runtime library, the mechanism comprising user-controlled means for directing heap allocation requests, said user-controlled means being located in the memory supplied by an executing program and including therein heap control data defining heap type and semaphores for multithreading.

2. A mechanism according to claim 1, wherein the user-controlled means comprises:
   means for locating a block of heap memory of a suitable size for fulfilling the allocation request; and
   means for storing information from said user-controlled means in the block of heap memory for defining the parameters of the block of heap memory.

3. A mechanism, according to claim 2 wherein said means for locating a block of heap memory of a suitable size comprises:
   means for reviewing existing available heap memory for a block of heap memory of at least a minimum size; and
   means for initiating a system of allocation of heap memory where no existing heap allocation block of at least said minimum size exists.

4. A mechanism according to claim 2, further comprising means for deallocating an allocated block of heap memory.

5. A mechanism according to claim 2, further comprising means for deallocating all allocated blocks of heap memory.

6. A mechanism according to claim 1, wherein the user-controlled means comprises means therein for setting a default heap definition in the operating system's runtime library.

7. A mechanism according to claim 6, wherein the user-controlled means comprises means for setting a heap definition in the operating system's runtime library for automatic heap allocation in response to an unspecified heap allocation request.

8. A process for creating at least one user heap from a user application having memory that contains heap control data defining both heap type and semaphores for multithreading when said user application is executing in an operating system having means for allocating heap memory and a runtime library, comprising the computer implemented steps of:
   (i) issuing a function call from the user application using said operating system's runtime library to create in memory supplied by said user application, a block of heap memory of a size at least equal to a minimum size;
   (ii) allocating a reserved area in memory supplied by said user application for holding said block of heap memory of said at least minimum size;
   (iii) assigning a pointer to a function in said runtime library, said function being adapted to call additional heap memory;
   (iv) assigning a second pointer to a function in said runtime library, said function being adapted to release heap memory; and
   (v) returning the heap to the user application.

9. A process according to claim 8 wherein steps (i) to (v) are repeated for every thread in a multithreaded user application.

10. A process according to claim 8 wherein steps (i) to (v) are repeated for each heap creation request issued by a plurality of user applications that are open concurrently.

11. A process according to claim 8, further comprising the step of inserting heap control data into a block of heap memory returned to the user application.

12. A process according to claim 11, wherein the step of inserting heap control data into a block of heap memory returned to the user application comprises inserting a first value into an initial four bytes of the block defining the size of the block and inserting a second value into a second four bytes of the block defining the heap handle.

13. A process for managing heap allocation from a user application, said application having a memory containing heap control data defining both heap type and semaphores for multithreading when executing in an operating system having means for allocating heap memory and a runtime library, comprising the computer implemented steps of:
   (i) issuing a function call from the user application using said operating system's runtime library for a heap allocation of a block size at least equal to a minimum size;
   (ii) determining if a block of heap memory of the heap type defined by said control data in said memory of said user application of at least the said minimum block size is available; and if such a block of heap memory is available in the runtime library;
   (iii) removing an object of a size equal to the size of the heap allocated, from the available heap memory; and
   (iv) returning said object to the user application.

14. A process according to claim 13 wherein steps (i) to (iv) are repeated for every thread in a multithreaded user application.

15. A process according to claim 13 wherein steps (i) to (iv) are repeated for each heap creation request issued by a plurality of user applications that are open concurrently.

16. A process according to claim 13, further comprising the step of issuing a function call from the user application to the runtime library for an increase in a heap allocation of at least a minimum size.

17. A process according to claim 13, further comprising the step of issuing a function call from the user application to the runtime library establishing the identity of a callback function for heap memory expansion.

18. A process for directing heap memory use from a user application having memory containing heap control data defining heap type and semaphores for multithreading when executing in an operating system having a runtime library and at least a secondary library, comprising the computer implemented steps of;
   (i) issuing a callback function from the user application to the runtime library to define in said runtime library a heap of the type defined by said data in said memory of said user application;
   (ii) subsequently issuing a callback function from the user application to the secondary library for construction of a data object on a default heap therein; and
   (iii) subsequently issuing a heap allocation request from the secondary library to the runtime library for construction of the data object on a default heap therein.

19. A process according to claim 18, wherein steps (i) to (iii) are repeated for every thread in a multithreaded user application.

* * * * *